Figure 1:
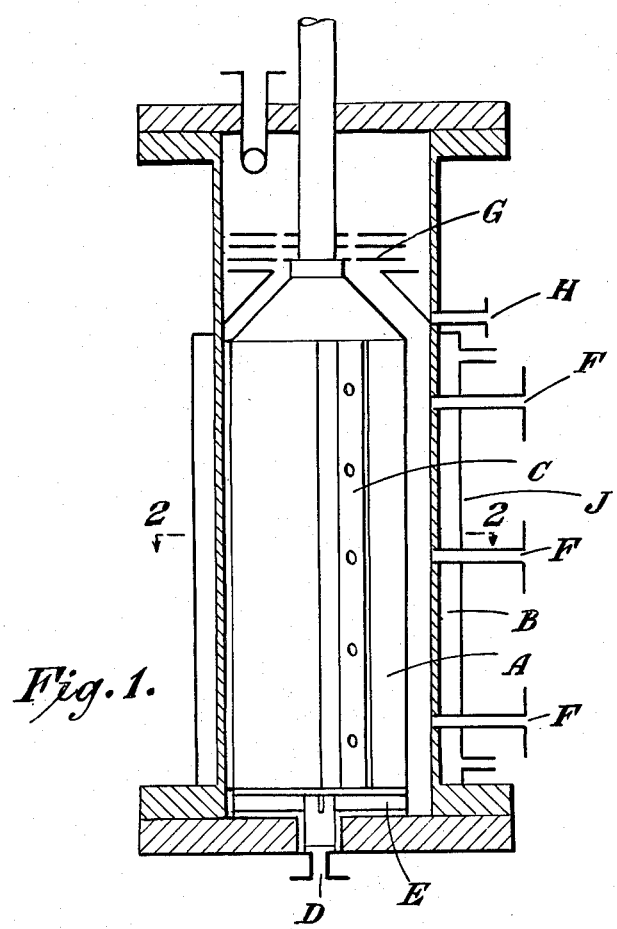

Oct. 4, 1960

R. HOLLINGS ET AL 2,955,026

MIXER REACTOR WITH SCRAPER

Filed Sept. 20, 1956

INVENTORS.
RAYMOND HOLLINGS
AND GEOFFREY PLACE.

United States Patent Office 2,955,026
Patented Oct. 4, 1960

2,955,026

MIXER REACTOR WITH SCRAPER

Raymond Hollings, 18 Highbury, Jesmond, Newcastle-upon-Tyne, England, and Geoffrey Place, 52 Otterburn Road, Preston Village, North Shields, England Filed Sept. 20, 1956, Ser. No. 630,719

Claims priority, application Great Britain Sept. 21, 1955

4 Claims. (Cl. 23—285)

This invention relates to apparatus for carrying out in a continuous manner chemical reactions in which the reactants are liquids or gases and liquids.

One object of the invention is to provide apparatus which produces intense turbulence and mixing of the reactants to ensure that rapid reaction takes place.

Another object is to provide such apparatus which ensures rapid removal of heat from the reaction zone in the case of exothermic reactions, or supply of heat in the case of endothermic reactions, so that control of reaction temperature is possible. This may be of special importance where one of the reactants or products is susceptible to deterioration as a result of local overheating.

According to the present invention, an apparatus for carrying out in a continuous manner chemical reactions involving liquids, or liquids and gases, comprises a stator and a rotor mounted on coincident or parallel axes and defining a reaction chamber therebetween of a cross section formed as a non-uniform annulus, blades so formed and mounted on either the stator or rotor as to extend across the reaction chamber and maintain contact with the rotor or stator correspondingly, thus dividing the reaction chamber into compartments which increase and decrease in volume as the rotor is rotated, and means establishing restricted communication between adjacent compartments of the reaction chamber. Such restricted communication is preferably established by perforations in the blades.

The stator may be in the form of a shell within which is a cylindrical rotor mounted on a coincident or parallel axis, the blades being mounted on the rotor to extend across the reaction chamber to contact the shell wall, so that, as the rotor is rotated, the compartments increase and decrease in volume.

Preferably the stator shell is circular in cross-section and the rotor axis is offset with respect to the stator axis.

As stated above the blades are preferably provided on the rotor when this is within the stator and is circular in cross-section; if, however, the rotor is of other cross sectional shape, for example elliptical and its axis is coincident with that of the stator, the blades are preferably provided on the stator surrounding the rotor.

The blades may either be hinged or slidably mounted on the stator or rotor, so that the further edges of the blades are in constant contact with the rotor or stator, respectively, thus serving to scrape the rotor or stator wall as the rotor is rotated.

The reactants may be admitted to the chamber either through ports in the stator or through ports in the rotor shaft. The apparatus is provided with suitable outlet ports through which the reaction products may be withdrawn.

There may be provided a centrifugal separator which is advantageously driven from the rotor shaft.

The stator and/or the rotor may be provided with heating or cooling means.

Figure 2:
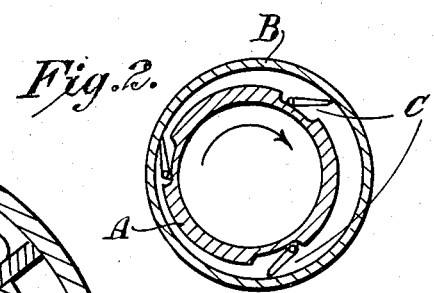
Figure 3:
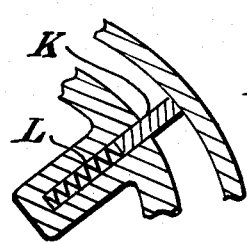

One embodiment of the apparatus of the invention is described below with reference to the accompanying drawing, in which Figure 1 shows a section in elevation of the apparatus on the plane defined by the axes of the rotor and the stator, Figure 2 shows a plan section of the apparatus on the line 2—2 in Figure 1, and Figure 3 is a fragmentary plan portion showing an alternative arrangement for the blades.

This particular embodiment of the apparatus is described with reference to its use for carrying out, in a continuous manner, the treatment of alkyl benzene with a mixture of sulphur trioxide vapor in air for the production of sulphonated alkyl benzene in detergent manufacture as described in our British specification No. 27,019/55. The apparatus is constructed of acid resistant material such as stainless steel.

A cylindrical rotor A rotates on a driven shaft inside a cylindrical stator shell B. The axis of rotation of the rotor is eccentric with respect to the stator. The annular space between the rotor and stator is swept by longitudinal blades C which are hinged to the rotor in such a way as to allow the edges of the blades to maintain constant contact with the shell of the stator. Springs may be incorporated to ensure this contact. The shell is jacketed as shown at J to allow cooling of the reaction zone.

A mixture of air and sulphur trioxide vapor is supplied continuously to the reaction zone by means of the ports F which are spaced along the length of the reactor. Alkyl benzene is supplied to the inlet D and is dispersed by means of radial blades E mounted on the end of the rotor. The pumps supplying alkyl benzene and sulphur trioxide are proportioning pumps geared together so that the ratio of the rate of flow of sulphur trioxide to that of alkyl benzene is maintained constant. The degree of turbulence and intimacy of mixing of liquid and gaseous reactants is dependent on the speed of the rotor, the eccentricity of the rotor with respect to the shell, the number of blades and the number of holes in the blades.

From the reaction zone, the reaction mixture passes to a centrifugal disc separator G driven by the same shaft as drives the rotor A. The liquid components of the reaction mixture are separated at the separator G and are taken off at the outlet port H to be sent to the neutralization stage. The separated gas is drawn off and may be passed through another separator to remove entrained liquid spray before being recycled to a sulphur trioxide vaporizer.

Figure 3 shows an alternative arrangement for the blades K, which are slidably mounted in slots in the rotor A, and are maintained in contact with the wall of the stator B by springs L.

What is claimed is:

1. Apparatus for continuously reacting at least two fluids of which at least one is in the liquid phase comprising a stator having an internal cavity of circular cross-section, a circular rotor mounted within the cavity of said stator, the axis of said rotor being parallel to but off-set with respect to the axis of said cavity so that the space between the rotor and stator defines an annular reaction chamber of constantly varying width, a plurality of blades mounted on said rotor, means for urging said blades against the wall of said stator to maintain constant contact therewith, said blades dividing the reaction chamber into compartments, the volume of said compartments being varied as said rotor and blades are rotated, perforations in said blades for establishing restricted communication between adjacent compartments of the reaction chamber, means for rotating said rotor whereby to produce intense turbulence and mixing of the reacting fluids to insure that rapid reaction takes place, said stator being closed at each end excepting for a fluid entrance opening at one end of said rotor and a fluid exit opening at the other end of said rotor.

2. The structure claimed in claim 1 including means for introducing fluid into said reaction chamber through said stator intermediate its ends.

3. The structure claimed in claim 2 wherein said rotor is of substantial diameter, wherein said fluid inlet opening is located substantially in an alignment with the axis of said rotor, and wherein the end of said rotor adjacent said fluid inlet opening carries blades for dispersing the fluid entering therethrough outwardly toward said reaction chamber.

4. The structure claimed in claim 3 wherein the opposite end of said rotor has a conical formation terminating in an axial shaft, wherein means within said stator coact with said conical formation to flow inwardly toward the axis of said rotor, and wherein said shaft within said stator has affixed thereto disc separator means whereby a separation of ingredients may be effected ahead of said fluid outlet opening.

References Cited in the file of this patent

UNITED STATES PATENTS

| | | |
|---|---|---|
| 883,729 | Merrett | Apr. 7, 1908 |
| 1,231,695 | Bell | July 3, 1917 |
| 1,872,198 | Van Rixel | Aug. 16, 1932 |
| 2,063,065 | Vogt et al. | Dec. 8, 1936 |
| 2,238,864 | Pratt et al. | Apr. 15, 1941 |
| 2,665,197 | Rowland | Jan. 5, 1954 |
| 2,672,404 | Schultz | Mar. 16, 1954 |
| 2,689,113 | Merrill | Sept. 11, 1954 |